Patented Apr. 28, 1942

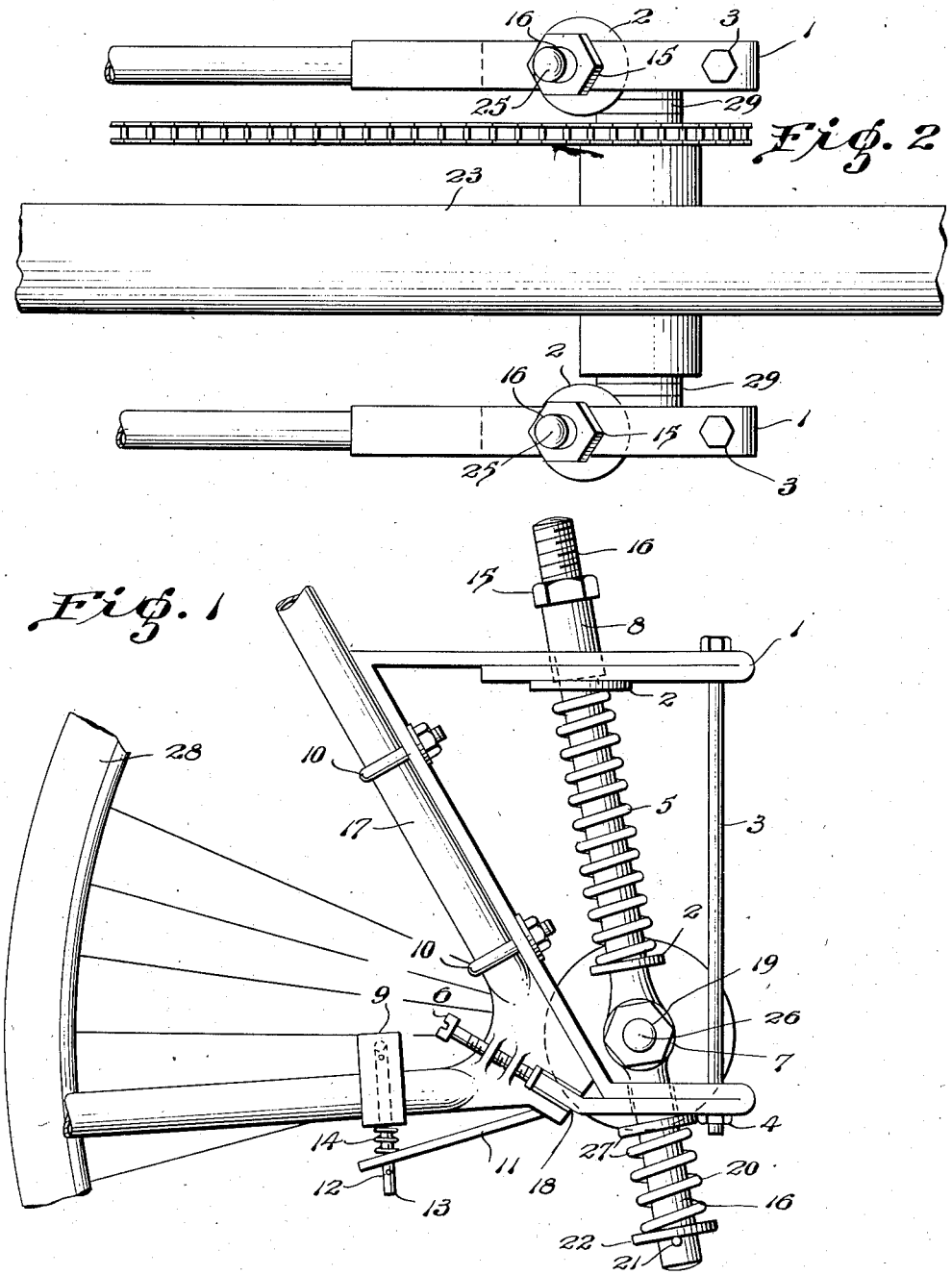

2,281,110

UNITED STATES PATENT OFFICE 2,281,110

BICYCLE AND THE LIKE VEHICLE

Harry Olof Olson, Chicago, Ill.

Application August 10, 1940, Serial No. 352,055

1 Claim. (Cl. 280—285)

My invention relates to bicycles, motorcycles and other similar vehicles upon which persons ride, and its object is to provide a spring actuated connection between the frame and the rear wheel, to absorb most of the jar caused in riding over rough and uneven ground and increase the comfort of the rider.

Another object is to provide a spring actuated connection between the frame and the rear wheel, whereby a spring absorbs the jars, jolts and bumps when riding over rough or uneven ground.

Another object is to provide spring actuated frames attached to both sides of the bicycle at the rear providing means for holding the rear wheel in proper alignment, connected to the axle of the rear wheel by yieldable means which absorb nearly all of the jars, jolts and bumps usual when riding over rough or uneven surfaces.

A further object, is to provide spring actuated means readily attachable to any bicycle frame which in turn are yieldably attached to the axle of the rear wheel, whereby the said yieldable means absorb practically all of the jars, jolts and bumps commonly experienced when riding over rough or uneven ground.

With the above and other objects in view, which will more particularly appear from the specification and drawing accompanying, in which like numerals of reference refer to similar parts throughout the various figures, Figure 1 shows a side elevation of the rear of any ordinary bicycle with my invention attached thereto.

Figure 2 shows a plan view as taken from above in Figure 1, showing the relative positions of the parts with regard to the bicycle and frame.

Referring now to the drawing, 17 indicates the end of any usual bicycle frame forked at the rear to receive the rear wheel there between and having the usual horizontal and diagonal portions connected at the point of jointure, at the rear ends thereof where they extend backward in the flat portion with the slot as shown. Two spring frames, 1—1 are attached at either side to the diagonal portion of the frame as shown, by means of the U-bolts 10—10. These spring frames provide means for mounting the parts hereinafter described.

The forwardly projecting portions at the bottom of the spring frames 1—1, are designed to engage the rearwardly extending slots in the rear of the frame at 18 and give the connection more rigidity, and also to provide means for adjusting the tension on the chain (not shown) by adjustment of the screws 6—6 in the usual manner as on all bicycles. The upper portion of the frame 1 is provided with the opening at 25, and the lower portion with the opening at 24 to receive the spring holding rod 16, which is slidably mounted in said holes and adapted to move upward and downward in operation as hereinafter described. Holes are provided near the lower ends of the spring holding rods as at 26, in which said holes the axle 19 of the rear wheel is securely mounted by means of the nut 7. A helical spring as 5 is placed upon the spring holding rod 16 above the axle, and below the upper portion of the frame 1, as shown, and washers as 2—2 are provided above and below the spring to provide a better seat for the ends of the spring. This spring 5 is of suitable strength to properly support the weight placed upon the bicycle frame, and may be further adjusted by means of the nut 15 threaded upon the upper end of the rod 16, and which contacts the spring through the sleeve 8 and the washer 2 at the upper end of the said spring. In addition to forming contact between the nut 15 and the washer 2 as above described, this sleeve also provides a covering for the threaded upper portion of the rod 16, and a smooth surface to engage the opening 20 in the frame 1 as the rod 16 moves up and down in operation as herein described. Rods 3—3 are provided connecting the upper and lower portions of the frames 1—1, with suitable nut 4 for the purpose of strengthening the said frames 1—1.

A suitable helical spring as 20 is also mounted on the lower extremity of the spring rod 16, as shown, with a suitable washer 27 above to form a suitable seat for said spring, and a washer mounted below said spring, as at 22 to form an adjustable lower seat for said spring with a cotter pin 21 to secure it in place. By this construction a spring actuated means is provided for limiting the upward movement of the spring rod and frame 1 in operation, and by limiting said recoil, prevents the bounce which often occurs on the worst of the bumps, and makes for easier riding and more comfort for the rider.

A suitable block 9 is attached to the horizontal portion of the bicycle frame 17, as shown. This block is employed for the purpose of supporting the rod 13, which in turn has the coil spring 14 mounted thereon, and held in place by the pin 12 passing through the rod 13. This means is provided to prevent the brake arm 11 from swinging around and in contact with other operating parts.

In operation the spring frames 1—1 attached to and supporting the bicycle frame 17, and in turn slidably mounted upon the rods 16—16 which in turn are mounted rigidly upon the axle of the rear wheel, with the springs 5—5 operably mounted between as shown, provide a yieldable construction which permits the bicycle frame to yield to upward pressure from the wheel of the bicycle being forced upward by uneven surfaces, thereby preventing the jars and jolts encountered in riding the usual bicycle. Also the provision of the spring 24—24 at the lower ends of the spring rods, prevent excessive recoil when the spring recoils from pressure of uneven ground, and thus adds to the comfort and enjoyment of the rider.

While I have described my invention as adapted to the ordinary bicycle, it will be apparent that it may be applied equally to motorcycles, and other like vehicles, and I claim said invention as applied to all such vehicles.

While I have shown my invention as adapted to the rear wheel of the bicycle, it will be apparent that it may be equally well applied to the fork and axle of the front wheel, if desired, giving a double spring suspension, the construction, of my device being adapted to hold said wheels in perfect alignment as required for successful operation.

Having described my invention, what I claim and desire to secure by Letters Patent is the following:

A shock absorbing wheel mount for a bicycle frame, comprising a frame member, means for attaching said member to a wheelfork of said bicycle frame, said member including top and bottom portions, aligned openings through said top and bottom portions, a reciprocable rod extending through said openings, means connecting a wheel axle to said rod intermediate said top and bottom portions, a coil spring around said rod between said axle and said top portion, a washer slidable on said rod and bearing against the top of said spring, a sleeve slidable on said rod above said washer, said sleeve slidably extending through said opening in said top portion and bearing against the upper surface of said washer, the upper end of said rod being threaded, a nut threaded on the upper end of said rod and bearing against the upper end of said sleeve to adjust the tension of said spring while protecting said threaded end of said rod during reciprocation through said opening in said top portion.

HARRY OLOF OLSON.